(12) United States Patent
Seznec

(10) Patent No.: US 6,272,592 B1
(45) Date of Patent: Aug. 7, 2001

(54) CACHE MEMORY DEVICE

(75) Inventor: André Seznec, Acigne (FR)

(73) Assignee: Inria Institut National de Recherche en Informatique et en Automatique, Le Chesnay Cedex (FR)

( * ) Notice: Subject to any disclaimer, the term of this patent is extended or adjusted under 35 U.S.C. 154(b) by 0 days.

(21) Appl. No.: 08/302,695

(22) PCT Filed: Mar. 2, 1993

(86) PCT No.: PCT/FR93/00212

§ 371 Date: Sep. 9, 1994

§ 102(e) Date: Sep. 9, 1994

(87) PCT Pub. No.: WO93/18458

PCT Pub. Date: Sep. 16, 1993

(30) Foreign Application Priority Data

Mar. 13, 1992 (FR) .................................. 92 03054
Mar. 2, 1993 (WO) .................................. PCT/FR93/00212

(51) Int. Cl.[7] .................................. G06F 7/5444
(52) U.S. Cl. .................................. 711/118
(58) Field of Search .................................. 395/403, 405, 395/446, 447, 412, 421.06, 407; 364/DIG. 1, DIG. 2

(56) References Cited

U.S. PATENT DOCUMENTS

| 4,315,312 | * | 2/1982 | Schmidt | 364/200 |
| 4,430,712 | * | 2/1984 | Coulson et al. | 364/300 |
| 4,894,770 | * | 1/1990 | Ward et al. | 364/200 |
| 5,133,061 | * | 7/1992 | Melton et al. | 395/425 |
| 5,287,482 | * | 2/1994 | Arimilli et al. | 395/425 |
| 5,353,424 | * | 10/1994 | Partoui et al. | 395/425 |
| 5,367,653 | * | 11/1994 | Coyle et al. | 395/400 |
| 5,434,990 | * | 7/1995 | Moussaui et al. | 395/425 |
| 5,442,571 | * | 8/1995 | Sites | 364/403 |

FOREIGN PATENT DOCUMENTS 0080062 11/1981 (EP) .
0334479 9/1989 (EP) .

OTHER PUBLICATIONS

Reese et al: "A sub–10nS Cache SRAM, for high performance 32 Bit microprocessors"; In: Proceedings of the IEEE 1990 Custom Integrated Circuits Conference, May 1990, Boston, pp. 2421–2424.

Hill et al: "Evaluating Associativity in CPU Caches"; In: IEEE Transactions on Computers; vol. 38, No. 12, Dec. 1989, New York, pp. 1612–1630.

Smith: "Cache Memories"; Computing Surveys, vol. 14, No. 3, Sep. 1982, pp. 473–530.

* cited by examiner

Primary Examiner—Paul R. Myers
(74) Attorney, Agent, or Firm—Venable; George H. Spencer; Allen Wood

(57) ABSTRACT

A cache memory device including an input/output (ESRQ) for receiving a request (REQ) having a main address (AP) and optional data (D); an input/output (ESMP) to an addressable main memory (MP) or another addressable cache memory; a plurality of X memory banks (BCi) wherein i is lower than X and higher than 0, each having a number Li of lines for containing data, the lines being individually designated by a local address (AL) in each bank; an arrangement for answering a request (REQ) by connecting the main address (AP) in the request to a local address (AL) in the bank (BCi) in accordance with a predetermined la (fi) for each bank (BCi), whereby the line thus designated in the bank (BCi) is the only line to contain the datum referred to by the main address; and an arrangement (CHA) for loading the cache memory according to the received requests. At least two predetermined laws (fi) are substantially distinct depending on the banks in question, and the two banks in question are addressed separately, hereby the average cache memory data access hit rate is improved.

5 Claims, 4 Drawing Sheets

CACHE MEMORY DEVICE

BACKGROUND OF THE INVENTION

1. Field of the Invention

The invention relates to the technological field of buffer or cache memories.

It finds a general application in data processing systems.

2. Background Information

Technological progress, in particular in the field of clock speeds and the integration of processors, tends to reduce increasingly the cycle times of the said processors and to permit the sequencing and execution of several instructions per cycle.

It follows therefrom that there is an increasingly heavy demand on the data flow in the main memory of a data processing system.

However, the technological progress has not made it possible to reduce the time of access to the data in the main memory at the same rate as the cycle times of the processors.

Indeed at present, the access time in the main memory is often of the order of several tens of processing cycles, even hundreds of processing cycles.

One known solution for masking the latency of the access to the data in the main memory lies in using cache memories (Computing Surveys, Vol.14, No.3, September 1982, pages 473–530, "Cache Memories").

In general, a cache memory is a fast access memory, generally of a small size, wherein a part of the set of data stored in the main memory is stored.

In practice, when a processor makes a request comprising a main address in the main memory, and possibly data, the cache memory responds to the said request either by connecting the main address contained in this request and a data line of the cache memory, when the desired data item is present and valid in the cache memory, or by signalling that it is absent in the opposite case. In this latter case, the processor addresses the main memory for accessing the desired data item. The data line in the main memory containing the desired data item can then be loaded into the cache memory.

Several cache memory systems are known, in particular the direct recording system also called "direct mapped", the wholly associative multibank system and the associative multibank set system (EP-A-0 334 479). These systems will be described in greater detail below.

It is clear that the use of cache memories accelerates the time of access to the data in the main memory, thanks to the fact in particular that the cache memories are faster than the main memories.

Nevertheless, the effective performance of data processing systems using cache memories depends on the average hit rate during access to the data in the said cache memories.

Now, this average hit rate is not entirely satisfactory in the above mentioned systems of cache memories.

SUMMARY OF THE INVENTION

The object of the invention is precisely that of improving the average hit rate during access to the data in the cache memories.

The invention relates to a cache memory device using a multibank system.

In the known way, the cache memory device comprises:

at least one request input/output for receiving a request for access to a data item stored in the addressable main memory or in another addressable cache memory, comprising a main address, and possibly data;

at least one main memory input/output connected to the main addressable memory for accessing the said desired data item of the main memory;

a plurality of memory banks, each having a number of lines capable of containing data, these lines being capable of being individually designated by a local address in each bank;

computing means connected to the request input/output and capable of answering the request by connecting the main address contained in this request to a local internal address in each of the banks, the line thus designated in the bank being the only line of the said bank that is capable of containing the data labelled by the main address;

loading means connected to the main memory input/output for loading the data line of the main memory containing the desired data item into the cache memory when it is not present in the cache memory.

According to a general definition of the invention, the computing means establish the said relation between the main address and the local address in the bank in accordance with a predetermined law associated with the said bank; at least two of the predetermined laws are distinct according to the banks in question; and the two banks in question are addressed separately, according to their respective law.

BRIEF DESCRIPTION OF THE DRAWINGS

Other characteristics and advantages of the invention will emerge in the light of the following detailed description and drawings wherein.

DETAILED DESCRIPTION

Figure 1:
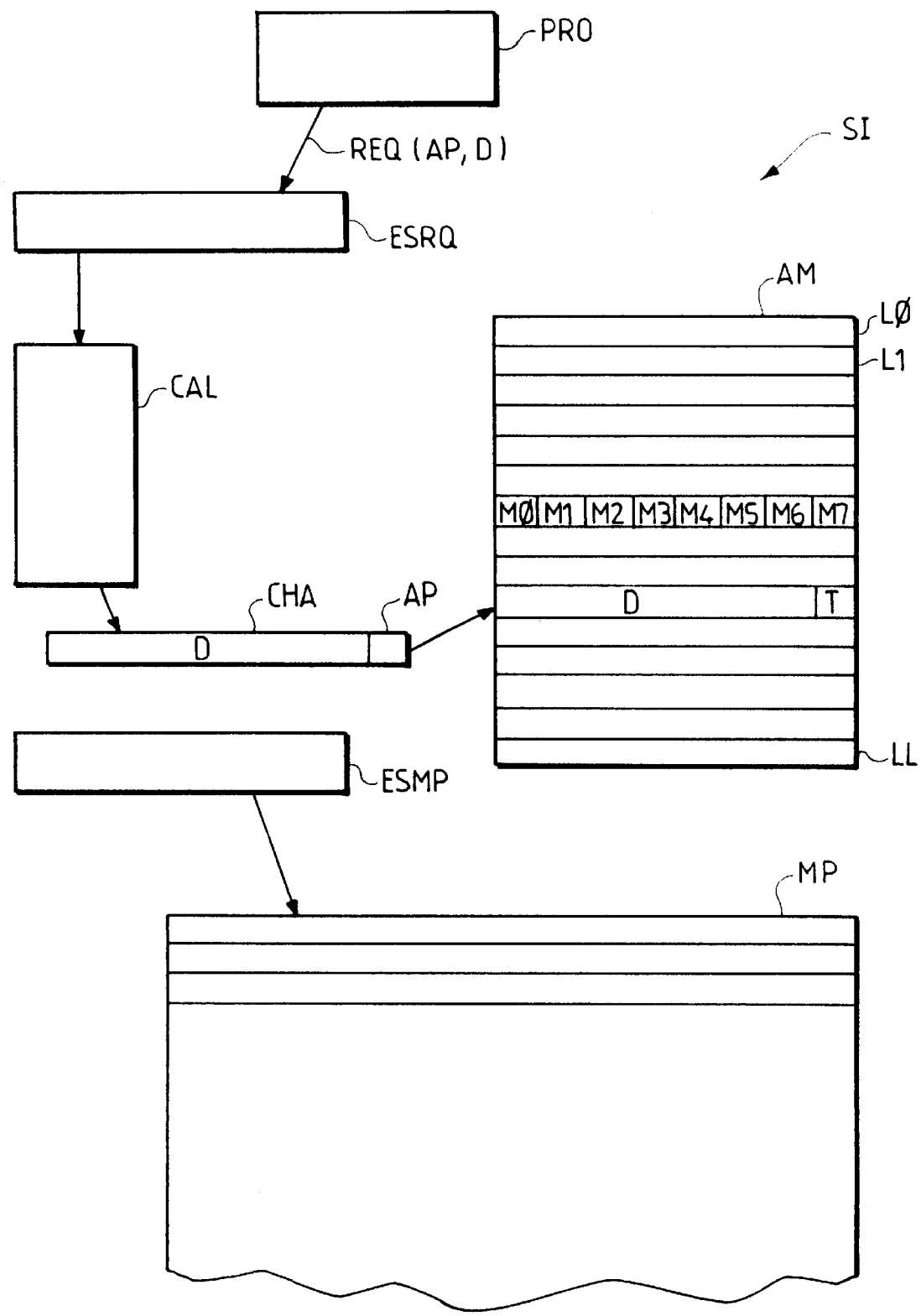
FIG. 1 is a schematic view of a known data processing system.

In Fig. 1, the reference SI designates a data processing system using a cache memory AM.

The cache memory AM includes L lines individually represented at L0 to LL each containing M words of B bits. For example, the cache memory AM comprises 64 lines of 8 words of 16 bits. The product L×B×M defines the bit size of the cache memory.

Data D and optionally tags T are stored in the lines of the cache memory.

The tags T serve for example to determine the main address AP in the main memory of the data stored in the line of the cache memory and to indicate the validity of the said data. It should be observed that it is the main address that is stored in the tag and which makes it possible to effect the connection between the data item in the cache memory and its address in the main memory.

When a processor PRO wishes to access a data item stored in the main memory MP, it makes at first a request REQ comprising the main address AP of the said desired data in the main memory MP and optionally the data.

The request REQ is then received by means forming the input/output ESRQ connected to means CAL that are capable of answering the request by connecting the main address AP contained in this request and local addresses AL of the cache memory AM in accordance with laws that are predetermined for the cache memory.

Loading means CHA load the cache memory according to the received requests.

When the desired data item is present in the data line L of the cache memory labelled by the local address AL, the processor accesses the desired data item.

In the opposite case, the processor addresses the main memory via the input/output means ESRQ for accessing the desired data item in the main memory.

The data line in the main memory containing the desired data can then be loaded into the cache memory in accordance with predetermined laws.

In the known way, the system of the cache memory differs according to its associativeness.

Figure 2:
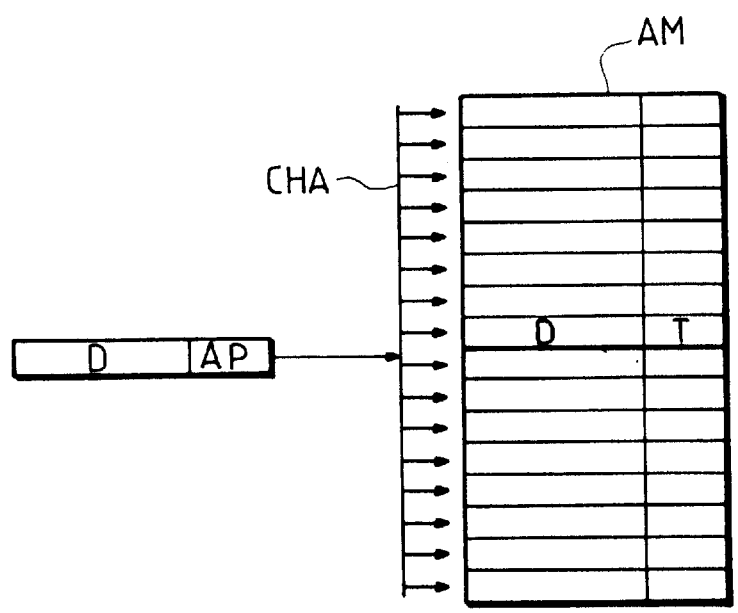
FIG. 2 is a schematic view of a cache memory arranged in accordance with a known system termed "wholly associative"

In FIG. 2, a cache memory has been represented arranged according to an system termed wholly associative.

In such an system, the loading means CHA load the data lines of the main memory into any line of the cache memory, and this irrespective of the main address of the data line in the main memory.

Such an system necessitates mechanisms for access to the cache memory of a considerable size and a prohibitive access time when the number of lines of the cache memory is large, since it is necessary to read the tag T of the presence of data of all the lines of the cache memory, and to compare the main address AP with the local address AL of the data line of the cache memory, this main address, as well as the information concerning the validity of the line being stored in a tag that is associated with the data line.

Figure 3:
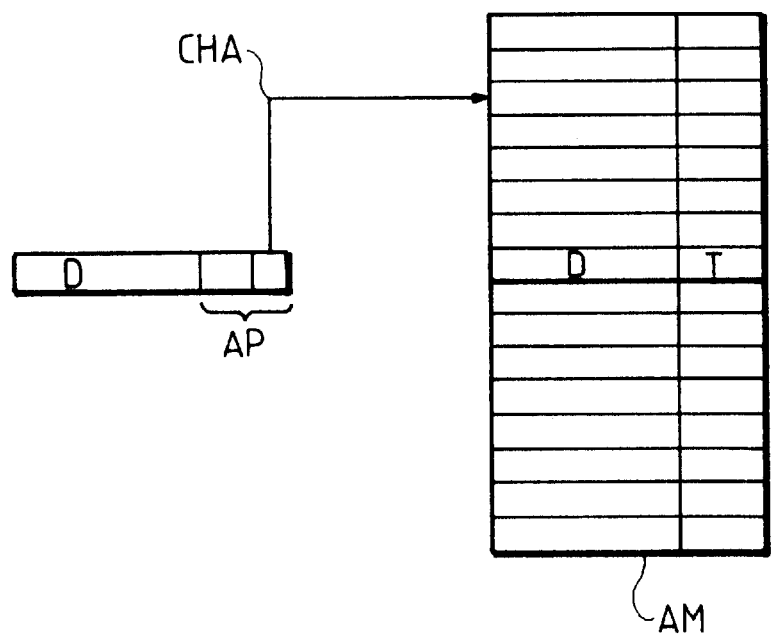
FIG. 3 is a schematic view of a cache memory arranged in accordance with a known system termed "direct mapped"

In FIG. 3, a cache memory has been represented that is arranged according to the system termed "direct mapped".

In such an system, the loading means CHA load or "map" the data lines in the main memory into lines of the cache memory whose respective local address AL is directly derived from the main address AP, most frequently by taking the significant bits of a lower weighting.

The system termed "direct mapped " is relatively simple. Indeed, starting from a data line in the cache memory, a single word and its associated presence tag T are read first of all. Subsequently, the local address AL of the line tag thus read, is compared with the main address AP to be loaded. In the case of an positive comparison, the data line in the main memory is loaded into the cache memory line thus labelled.

But during the running of a program, it is possible that several lines in the main memory may wish to be mapped to the same line of the cache memory and enter therefore into conflict, which produces setbacks during the operations of accessing the cache memory.

It follows therefrom that such an system has the drawback of having a lower hit rate during access to the data in the cache memory than the preceding system.

Figure 4:
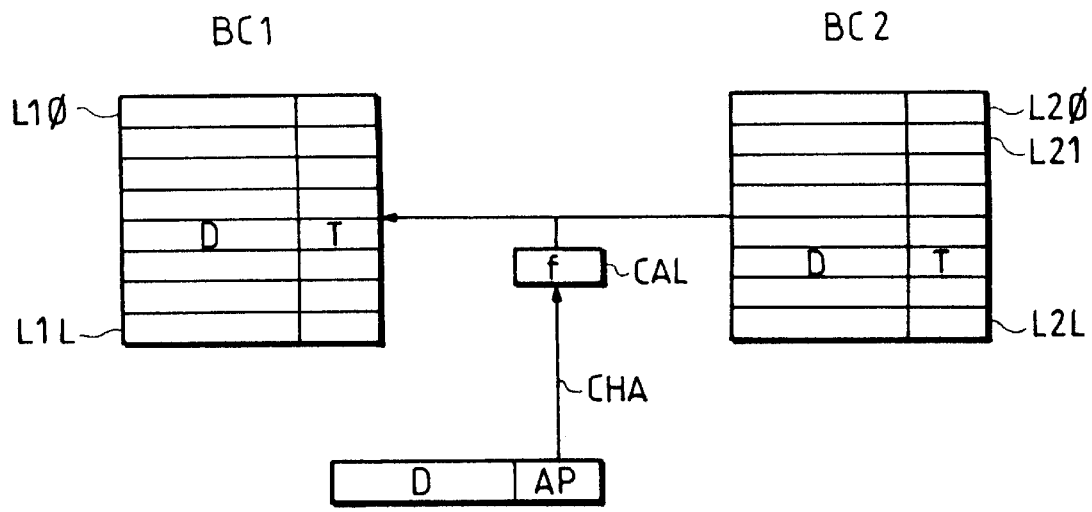
FIG. 4 is a schematic view of a multibank cache memory arranged according to a known system termed "associative by set"

In FIG. 4, there has been represented a possible representation of a cache memory according to the multibank system termed associative per set.

In such an system, the cache memory AM is subdivided into X banks BCi with i being less than X and greater than 0, each having a number Li of lines that are capable of containing data D.

Here the number of lines Li is the same in all the banks. In a variant, it could be different according to the banks in question.

The banks BC1 have ultrafast accessibility. They are made, for example, in a static RAM technology with an access time of the order of 6 to 12 $10^{-9}$ seconds.

These lines LI can be individually designated by a local address ALI.

For example, the cache memory is subdivided into two banks individually represented at BC1 and BC2, each having 8 lines individually represented at L10 to L17 for BC1 and L20 to L27 for BC2.

In practice, the means CL respond to a request REQ containing a main address, and possibly data, by connecting the main address AP contained in this request, and the same local address LA in each of the banks BCi according to a predetermined law f, the line thus designated in the bank BCi being the only line of the said bank BCi that is capable of containing the data item labelled by the main address AP.

In other words, a data line in the main memory may be mapped in any of the lines of the set constituted by the lines of the local address AL in the banks BCi. The local address AL is determined by the main address AP, most frequently, the local address is directly derived from the bits of the lowest weighting of the main address AP.

However, such an system is not entirely satisfactory, inasmuch as the addressing of the banks is effected jointly according to the same predetermined law f. In other words, the data lines in the main memory are loaded into one or the other of the banks, and this at the same local address in each bank.

It follows therefrom, that with such an system, that is to say, with joint addressing of the banks, the average hit rate during access to the data in the cache memory may sometimes be relatively low.

For example, when. (x+1) data lines in the main memory relating to the same application have to be mapped in the set constituted by lines of the same local address AL, the (x+1) data lines cannot be present together in the cache memory, which introduces conflicts.

The Applicant has set himself the task of providing a solution to this problem.

The solution brought to this problem in accordance with the invention lies in introducing into a multibank system of the cache memory the use of local addressing functions that are distinct for the memory banks, and therefore a separate addressing system of the banks.

Figure 5:
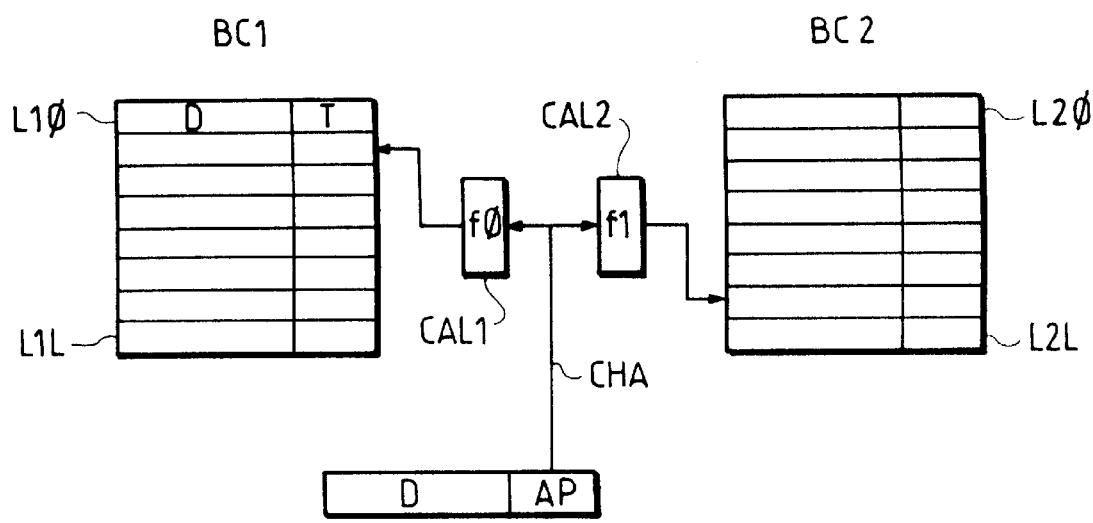
FIG. 5 is a schematic view of a multibank cache memory arranged in accordance with an system that is associative by set, modified according to the invention.

Reference will now be made to FIG. 5 which schematically represents a cache memory arranged according to an associative system modified in accordance with the invention.

The cache memory AM subdivided into two banks BC1 and BC2 having respectively L1 and L2 lines will again be found; the lines contain data D and are individually designated by a local address AL.

For the bank BC1, the computing means CAL1 responds to a request by connecting the main address AP contained in the request to a local address AL1 in the bank BC1 according to a predetermined law F1, the line thus designated in the bank BC1 being the only line of the said bank BC1 that is capable of containing the data item labelled by the main address AP.

Similarly, for the bank BC2, the computing means CAL2 responds to a request by connecting the main address AP contained in this request to a local address AL2 in the bank BC2 according to a predetermined law F2, the line thus designated in the bank BC2 being the only line of the said bank BC2 that is capable of containing the data item labelled by the main address AP.

Surprisingly, the Applicant has found that by replacing the joint addressing of the banks described with reference to FIG. 4 by separate addressing and by making the two laws distinct according to the two banks in question, the hit rate during access to the data in the cache memory is improved.

Indeed, with a separate addressing of the banks, the data lines in the main memory are now loaded into one or the other of the banks, and this to local addresses that may differ from one bank to the other.

Thus when (x+1) data lines in the main memory come into conflict for being mapped in the same line of the cache memory in the bank BC1, it is possible that they will not come into conflict in the other banks BCj of the cache memory and may thus be present at the same time in the cache memory, which makes it possible to avoid certain setbacks during access to the cache memory.

To permit separate addressing of the banks, it is necessary to differentiate the laws connecting the main address contained in a request and a local address in the bank in question.

To obtain a better hit rate in accessing the cache memory, it is necessary to choose the laws fi carefully.

The Applicant has found first of all that the laws fi must be equitable.

A law fi connecting the main address of a data line to the local address in the bank BCi is said to be equitable if, for each line of the bank BCi, the number of lines of data D that can be mapped in the said line is unique and equal to that of all the lines of the bank BCi.

Subsequently, the Applicant has found that the laws fi must be dispersive relative to one another.

A law fi is said to be a law of dispersion relative to the law Fj if the law Fj restricted to the set of lines that can be mapped in a predetermined line of the bank BCi is equitable.

Finally, the Applicant has found that the laws fi must not have any spatial locality.

Indeed, many applications have a spatial locality, that is to say, that in these applications the data used in a short lapse of time have main addresses that are relatively close to one another.

Now, to prevent any conflicts from arising, it is desirable to choose laws fi which make it possible to prevent two lines whose main addresses would be close to one another (that is to say, being almost consecutive) from being mapped in the same line of the bank BCi.

We will now describe a group example of the laws fi applied to a cache memory constituted by four banks of $2^n$ lines of $2^c$ octets each. It will be assumed that the main memory has $2^q$ octets where $q \geq 2 \times n + c$.

Let us consider the binary representation of a main address AP in four strings or bits AP=(A3, A2, A1, A0) where A0 is a string of c bits representing the displacement in the lines, where A1 and A2 are two strings of n bits and where A3 is the string of the most significant q−(2×n+c) bits.

If $(y_n, y_{n-1}, \ldots, y_1)$ is the binary representation of $y = \Sigma i=1, n\ y_i\ 2^{i-1}$, let us consider the function H defined by formula I in the Annex and the four laws fi defined by the formulae II to V in the Annex.

The expert will understand that the laws fi to f4 are equitable.

Moreover, for each pair (i, j) in {1,2,3,4}, the law fi is equitable relative to fj for values of n=3,4,6,7,9,10,12,13,15 and 16.

Finally, the local dispersion of data in a single bank is virtually optimal; whatever the cache memory line in question, in a set of $K \times 2^n$ data lines of consecutive addresses, there are at most K+1 lines that can be mapped in the said line.

It should be observed that the establishment of the laws described above is simple.

Indeed, each bit of fi (AP) is obtained by the EXCLUSIVE OR of at most 4 bits of the binary chop of the main address AP.

Moreover, the necessary material for establishing the laws fi is the same whatever the law: it is a matter of computing $H(x) \oplus H^{-1}(y) \oplus z$ where x, y, z are strings of n bits.

Figure 6:
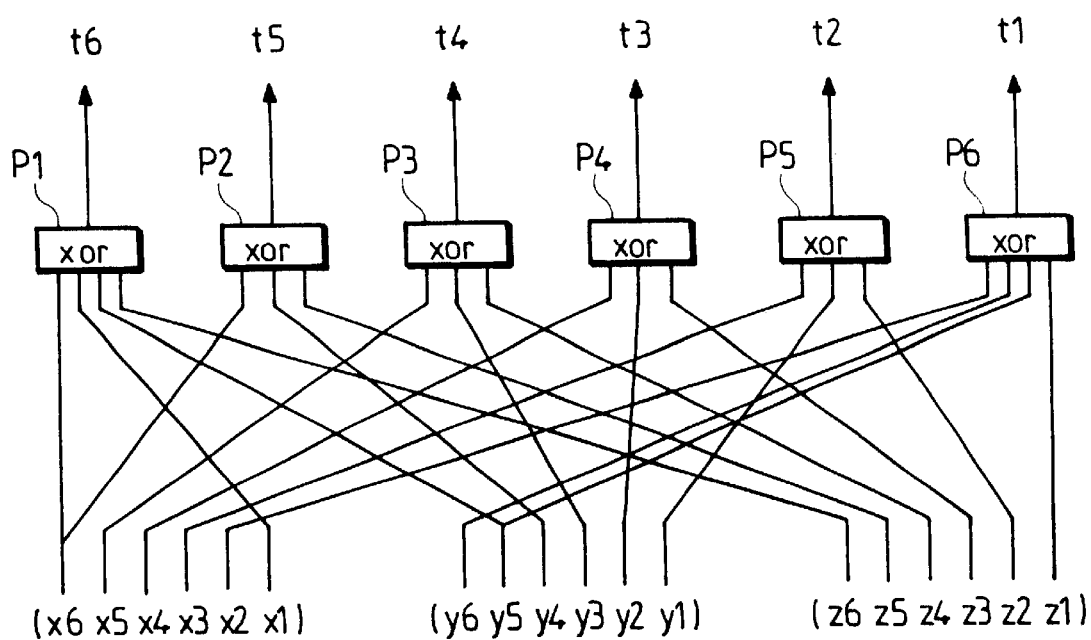
FIG. 6 is a schematic view of a law allowing the main address contained in a request to be connected to a local address in a bank in accordance with the invention.

A mechanism for establishing this law in accordance with the invention is represented in FIG. 6.

To compute $H(x) \oplus H^{-1}(y) \oplus z$ where x,y,z are strings of 6 bits individually represented at x6 to x1; y6 to y1 and z6 to z1, 6 XOR gates individually represented at P1 to P6 are used.

Each gate P has 3 or 4 inputs, each receiving one of the bits of the strings x, y or z and an output delivering a bit t.

As shown in FIG. 6, one input of the gate P1 and one input of the gate P2 receive for example, the bit x6.

The setting up of the inputs of the XOR gates represented in FIG. 6 forms one example of the embodiment of the invention.

Of course, other set-ups in accordance with the invention make it possible to check the properties of the above mentioned laws.

The Applicant has found that for cache memories of equal sizes, the behaviour of a cache memory with two banks arranged in accordance with the invention has a distinctly higher hit rate than that of a two-bank cache memory that is associative per set and is approximately comparable to that of a four-bank cache memory that is associative per set. The behaviour of a four-bank cache memory arranged in accordance with the invention has a hit rate that is higher than that of a four-bank cache memory that is associative per set and is approximately comparable to that of an-eight bank cache memory that is associative per set.

ANNEX

Formula I
$H: \{0, \ldots, 2^n-1\} \to \{0, \ldots, 2^n-1\}$
$\{y_n, y_{n-1}, \ldots, y_1\} \to y_n \oplus \{y_1, y_n, y_{n-1}, \ldots, y_3, y_2\}$
where $\oplus$ is the OR EXCLUSIVE OPERATION (XOR)

Formula II
$f_1: S \to \{0, \ldots, 2^n-1\}$
$(A_3, A_2, A_1, A_0) \to H(A_1) \oplus H^{-1}(A_2) \oplus A_2$ Formula III
$f_2: S \to \{0, \ldots, 2^n-1\}$
$(A_3, A_2, A_1, A_0) \to H(A_1) \oplus H^{-1}(A_2) \oplus A_1$ Formula IV
$f_3: S \to \{0_1, \ldots, 2^n-1\}$
$(A_3, A_2, A_1, A_0) \to H^{-1}(A_1) \oplus H(A_2) \oplus A_2$ Formula V
$f_4: S \to \{0_1, \ldots, 2^n-1\}$
$(A_3, A_2, A_1, A_0) \to H^{-1}(A_1) \oplus H(A_2) \oplus A_1$.

What is claimed is:

1. An improved cache memory device for use in a data processing system which includes an addressable main memory (MP); at least one request input/output (ESRQ) for receiving a request (REQ) for access to a data item stored in the addressable main memory (MP) or in the cache memory device, the request (RQ) including a main address (AP) of the desired data item; at least one main memory input/output (ESMP) connected to the main addressable memory (MP) for accessing the desired data item of the main memory; a plurality of X memory banks (BCi) with i being less than or equal to X and greater than 0, each having a number Li of lines capable of containing data, these lines being capable of being individually designated by a local address (ALi) in each bank (BCi); computing means (CAL) connected to the request input/output (ESRQ) and capable of answering the request (REQ) by transforming the main address (AP) contained in this request to a local address (AL) inside each of the banks (BCi), the line thus designated in the bank (BCi) being the only line of the said bank that is capable of containing the data labelled by the main address; and loading means (CHA) connected to the main memory input/output (ESMP) for loading the data line of the main memory containing the desired data item into the cache memory device if it is not present in the cache memory device, wherein the improvement comprises:

the computing means (CAL) comprises means for transforming the main address (AP) into a first local address in a first one of the memory banks in accordance with a first predetermined law associated with the first one of the memory banks, and for transforming the main address (AP) into a second local address in a second one of the memory banks in accordance with a second predetermined law which is associated with the second one of the memory banks, the first and second predetermined laws are distinct, and the first and second memory banks are addressed separately, according to their respective law.

2. A device according to claim 1, wherein laws for transforming the main address (AP) into local addresses are different for all the memory banks.

3. A device according to claim 1, wherein the first and second predetermined laws are equitable laws.

4. A device according to claim 1, wherein the first and second predetermined laws are dispersive laws.

5. A device according to claim 1, wherein the first and second predetermined laws are laws which do not have any spatial locality.

* * * * *